(12) United States Patent
Thiel et al.

(10) Patent No.: US 6,384,662 B1
(45) Date of Patent: May 7, 2002

(54) ELECTRONIC CIRCUIT

(75) Inventors: Christian Thiel, Brennenburg; Hans-Christian Essl, Neudorff/Pettendorf; Klaus Panzer, Regensburg, all of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/786,268

(22) PCT Filed: Sep. 1, 1999

(86) PCT No.: PCT/EP99/06436

§ 371 Date: Jun. 13, 2001

§ 102(e) Date: Jun. 13, 2001

(87) PCT Pub. No.: WO00/14889

PCT Pub. Date: Mar. 16, 2000

(30) Foreign Application Priority Data

Sep. 2, 1998 (DE) .......................... 198 39 997

(51) Int. Cl.$^7$ .......................... H01L 31/00; H03K 17/78
(52) U.S. Cl. .......................... 327/514; 327/478
(58) Field of Search .............................. 327/432, 440, 327/478, 502–504, 514, 580, 584, 594

(56) References Cited

U.S. PATENT DOCUMENTS

| 5,115,236 A | 5/1992 | Köhler | 340/825.69 |
| 5,305,459 A | 4/1994 | Rydel | 395/750 |
| 5,448,056 A * | 9/1995 | Tsuruta | 327/342 |
| 6,242,732 B1 * | 6/2001 | Rantakari | 327/514 |
| 6,304,096 B1 * | 10/2001 | Schweighofer | 327/514 |

FOREIGN PATENT DOCUMENTS

| EP | 0 367 333 A1 | 10/1988 |
| WO | WO 99/03219 | 1/1999 |

* cited by examiner

Primary Examiner—My-Trang Nuton
(74) Attorney, Agent, or Firm—Crowell & Moring LLP

(57) ABSTRACT

An electronic circuit arrangement has a receiving component that detects an incoming physical signal, and supplies an electrical signal current in response thereto, as well as a control and analysis component which is fed by a supply voltage and is acted upon by the electrical signal current. The electronic circuit arrangement can be operated in a working state, in which a power is consumed, and in a rest state, in which no power is consumed. A quiescent current detector is connected in parallel to the receiving component and the control and analysis component. In the rest state of the circuit arrangement (when the supply voltage is switched off), the quiescent current detector detects the signal current supplied by the receiving component, and controls switching-on of the circuit arrangement into the operative state in response thereto.

10 Claims, 1 Drawing Sheet

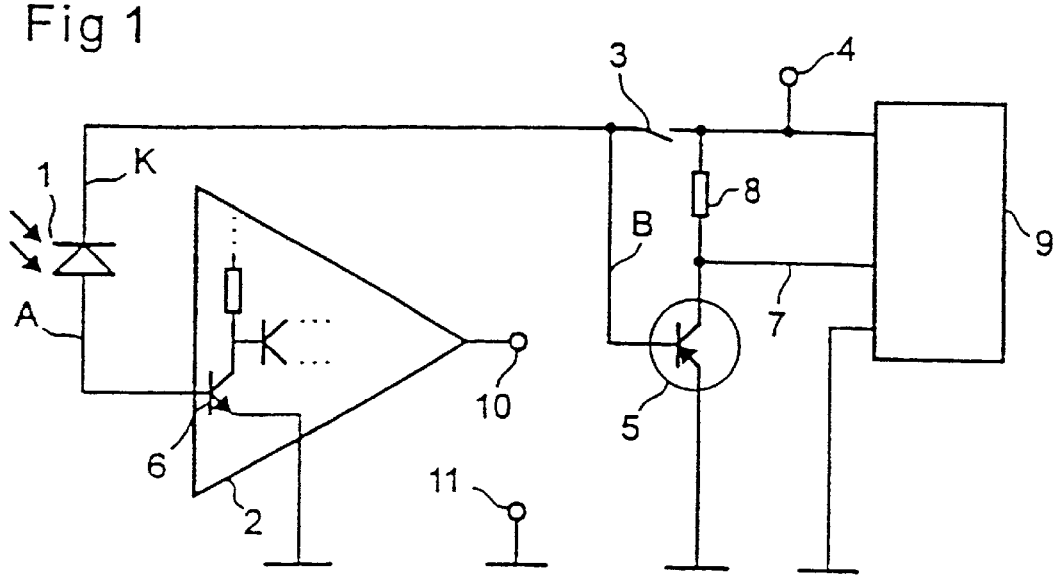
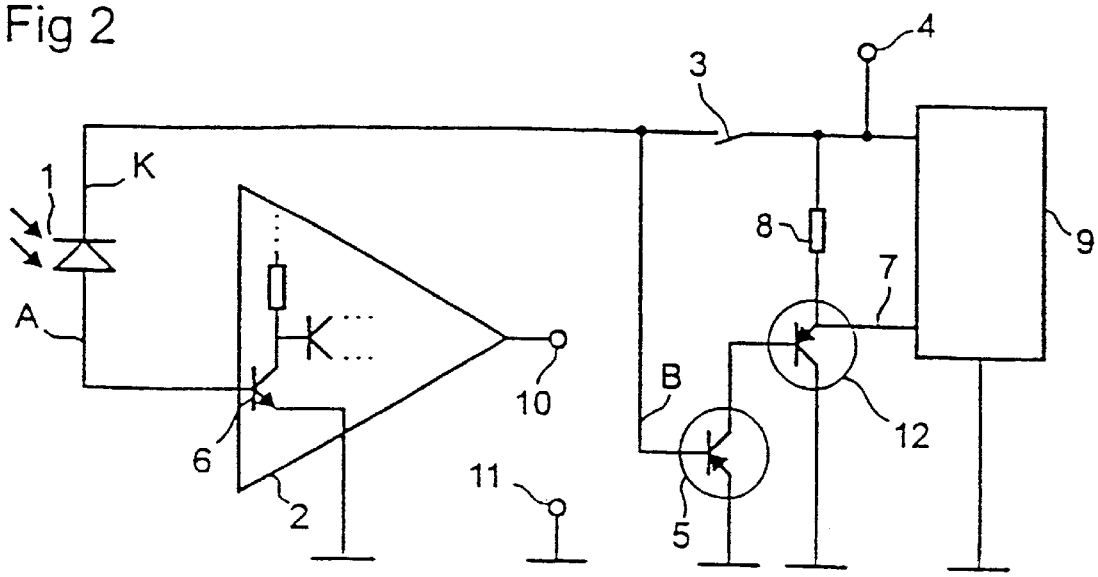

ELECTRONIC CIRCUIT

BACKGROUND AND SUMMARY OF THE INVENTION

This application claims the priority of German patent document 198 39 997, filed Sep. 2, 1998 and PCT International Patent Application No. PCT/EP99/06436, filed Sep. 1, 1999, the disclosures of which is expressly incorporated by reference herein.

The invention relates to an electronic circuit arrangement, which has a receiving component that detects an incoming physical signal, and supplies an electrical signal current in response thereto. The circuit arrangement includes a control and analysis component assigned to the receiving component, which is fed by a supply voltage, is acted upon by the electrical signal current and, on whose signal output, an electric analysis signal can be tapped. The electronic circuit arrangement can be operated in a first (operative) state, working when the supply voltage is switched on, and in a second (rest) state, resting without any power consumption when the supply voltage is switched off.

In many technical applications, receiving circuits for incoming physical signals are held in a wait state or rest state when no signals arrive which are to be analyzed. That is, for the purpose of an operating mode which consumes as little current as possible, it is advantageous for the circuit arrangement to be changed to a so-called "sleep mode" and, after a restarting of the signals to be detected, to automatically be changed back into the normal operative state. In the sleep mode, the circuit arrangement should consume as little electric power as possible.

Circuit arrangements are known, for example, for a use in optical transmission paths with optical waveguides, in which the opto-electronic receiver can be changed to a "sleep mode". In a known embodiment, the implementation of the "sleep mode" function requires, in addition to the optical waveguide which transports the optical information to the optical receiving element, a separate electric connection for controlling the operating mode. In another known "sleep mode" circuit, which requires no additional electrical line, significantly higher switching expenditures are required, which result in an undesirably high current consumption in the "sleep mode". In a preferred use of the circuit in a data transmission path in a motor vehicle, this is crucial because each saved cable and low current consumption in the sleep mode are important.

An electronic circuit arrangement of the above-mentioned type is disclosed in U.S. Pat. No. 5,115,236, in which a receiving part supplies an electric signal current and transmits it to an analysis unit. The analysis unit is coupled with a control device that is also acted upon by a quiescent-current detector which, among other things, comprises an operational amplifier. From the operational amplifier, an intensified signal current of the receiving part is transmitted to the control device which generates a corresponding through-connection signal for the analysis part. However, the present quiescent-current detector is constantly acted upon by the supply voltage and consumes a continuous quiescent current.

It is an object of the invention to provide an electric circuit arrangement of the above-mentioned type which, by means of simple circuit-related devices, controls a power consumption of the circuit arrangement in the rest state which is as low as possible.

This and other objects and advantages are achieved by the circuit arrangement according to the invention, in which a quiescent-current detector is connected parallel to the series connection consisting of the receiving component and the control and analysis component. In the rest state of the circuit arrangement (that is, when the supply voltage is switched off) the quiescent-current detector detects the signal current supplied by the receiving component, and controls switching-on of the circuit arrangement into the operative state in response thereto.

According to the invention, the quiescent-current detector comprises a switch that can be controlled by way of the quiescent current. It blocks in the operative state as well as in the rest state of the circuit arrangement, as long as no inherent current is present; and in the rest state, when a signal current of the receiving component is present, it supplies a control signal, as a result of which, by way of the subsequent logic, the circuit returns into the operative state.

The invention provides a circuit arrangement which can be used particularly for the application of very fast optical transmission paths with a continuous data flow in a motor vehicle. When used in a motor vehicle, it is very important to be able to operate the circuit arrangement in a sleep mode in which the receiver will still be active also in the case of a most minimal current consumption. When the physical (particularly optical) signal to be detected is restarted, it must automatically return to the normal operative state.

According to a particularly preferred embodiment of the invention, the quiescent-current detector comprises a switching transistor whose control connection is acted upon by the quiescent current; one of its electrode connections is coupled to ground, and the other is coupled to the supply voltage, by way of a high-ohmic resistor.

In another advantageous embodiment of the invention, the receiving component and the control and analysis component are formed by a hard-wired functional module with only three connections (ground, signal output and supply voltage) accessible from the outside.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic diagram of a circuit arrangement according to a first embodiment of the invention; and FIG. 2 is a schematic diagram of a circuit arrangement according to a second embodiment of the invention.

DETAILED DESCRIPTION OF THE DRAWINGS

The embodiment of a circuit arrangement according to the invention illustrated in FIG. 1 has an optical receiving element 1 in the form of a photodiode whose anode A is situated at the input of an amplifier circuit 2. Its cathode K is connected, on the one hand, by way of a switch 3, with the supply voltage 4 and, on the other hand, with the control input B of a quiescent-current detector formed by a switching transistor 5. By way of the switch 3, the switching arrangement is changed between the rest state or the operative state.

According to the invention, the quiescent-current detector 5 is operated in the blocking direction; that is, it blocks in the operative state as well as in the rest state of the circuit arrangement as long as no signal current is received from the photodiode 1. In this case, the base emitter path of the switching transistor 5 compensates the base emitter path of a transistor 6 in a first phase of the amplifier circuit 2. Thus, when the switch 3 is open, the photodiode 1 can be maintained according to the invention in the photovoltaic operation; that is, without bias voltage.

Without this circuit arrangement, the internal voltage of the photodiode in photovoltaic operation would be lower than the voltage of the base emitter path of the transistor 6, and the photocurrent could not be tapped. The photocurrent of the photodiode 1 can now be tapped for through-connecting the switching transistor 5 which connects through on the basis of this signal, and therefore supplies on the line 7 by way of the high-ohmic resistor 8 a starting signal to a subsequent logic circuit 9. The logic circuit 9 can then clear the supply voltage 4 (for example, +5 Volt) again by way of the switch 3. The circuit will then again be in the normal ready-to-receive operative state, and the signals of the diode 1 are emitted by way of the amplifier 2 to the output 10.

FIG. 2 illustrates a second embodiment of the invention, in which, as a modification of the circuit arrangement according to FIG. 1, after the pnp switching transistor 5, a pnp amplification transistor 12 is switched which, on the one hand, is connected with the ground and, on the other hand, with the high-ohmic resistor 8 (for example, 100 k ohm) at which by way of the control line 7, a control signal is tapped by the logic circuit 9. The advantage of this circuit supplement is the fact that the circuit is even more sensitive to light without the creation of an additional quiescent current.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic circuit arrangement which is operable in a working state when a supply voltage is switched on, and in a rest state, resting without power consumption when the supply voltage is switched off, said electronic circuit arrangement comprising:

a receiving component which detects an incoming physical signal, and supplies an electrical signal current in response thereto;

a control and analysis component connected in series with the receiving component, which control and analysis component is fed by the supply voltage, is acted upon by the electrical signal current, and has a signal output, on which an electric analysis signal can be tapped;

a quiescent-current detector connected parallel to the series connection of the receiving component and the control and analysis component, which quiescent-current detector, in the rest state of the circuit arrangement, detects signal current supplied by the receiving component and, generates a control signal that controls switching-on of the circuit arrangement into the operative state, in response thereto; wherein, the quiescent-current detector comprises a switch that is controllable by way of the signal current;

the switch blocks in the operative state as well as in the rest state of the circuit arrangement as long as no signal current is present;

the switch supplies the control signal when a signal current is present in the rest state of the circuit arrangement.

2. The circuit arrangement according to claim 1, wherein:

the quiescent-current detector comprises a switching transistor having a control connection that is acted upon by the signal current;

one electrode connection of the switching transistor is coupled with the ground; and another electrode connection of the switching transistor is coupled to the supply voltage by way of a high-ohmic resistor.

3. The circuit arrangement according to claim 2, wherein the switching transistor blocks in each operative state of the circuit arrangement, as long as no signal current is present.

4. The circuit arrangement according to claim 3, further comprising an amplifying transistor connected behind the switching transistor.

5. The circuit arrangement according to claim 1, wherein the receiving component and the control and analysis component comprise a hard-wired functional module with only three connections, ground, signal output and supply voltage, accessible externally.

6. The circuit arrangement according to claim 1, further comprising a logic circuit connected behind the quiescent-current detector, which logic circuit analyses the control signal supplied by the quiescent-current detector in the rest state of circuit arrangement, the logic circuit being kept current-free, and only after a quiescent current is present, the logic circuit being automatically switched on.

7. The circuit arrangement according to claim 1, wherein the receiving component comprises a light detector.

8. The circuit arrangement according to claim 7, wherein the light detector is a photodiode.

9. The circuit arrangement according to claim 7, wherein:

the control and analysis component comprises a base emitter path of a transistor; and the quiescent-current detector connected parallel to the series connection of the photodiode and the base emitter path, has a switching transistor connected complementary to the base emitter path.

10. The circuit arrangement according to claim 9, wherein the base emitter path is formed by an npn transistor, and the switching transistor of the quiescent-current detector is formed by a pnp transistor.

* * * * *